No. 12,327. REISSUED MAR. 21, 1905.

D. TAGGART.

CAR BRAKE APPLIANCE.

APPLICATION FILED JAN. 23, 1905.

Witnesses
Paul Finckel
Lillie M. Perry.

Inventor
Daniel Taggart
by Hum Hudson & Mehlhop
his Attorneys

No. 12,327. Reissued March 21, 1905.

UNITED STATES PATENT OFFICE.

DANIEL TAGGART, OF INDIANAPOLIS, INDIANA, ASSIGNOR, BY MESNE ASSIGNMENTS, TO THE CINCINNATI CAR COMPANY, OF CINCINNATI, OHIO, A CORPORATION OF OHIO.

CAR-BRAKE APPLIANCE.

SPECIFICATION forming part of Reissued Letters Patent No. 12,327, dated March 21, 1905.

Original No. 652,055, dated June 19, 1900. Application for reissue filed January 23, 1905. Serial No. 242,430.

*To all whom it may concern:*

Be it known that I, DANIEL TAGGART, a citizen of the United States, residing at Indianapolis, in the county of Marion and State of Indiana, have invented certain new and useful Improvements in Car-Brake Appliances; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to an appliance that is designed to be attached to the lower end of a brake-staff of a railway-car, either of the steam-railway or street-railway type of car; and it consists in an eccentrically-shaped drum provided with link-recesses arranged as a channel inclined about the periphery of the drum from one end to the other end thereof, whereby the act of taking up the slack of the chain is accelerated.

My object is to provide an improved device whereby the operator may quickly take up the necessary slack in the brake connections when applying the brakes, and thus be enabled to avoid accidents when his time for applying brakes is limited, and this is accomplished in my invention, which is cheaply made and durable in use.

Figure 1:
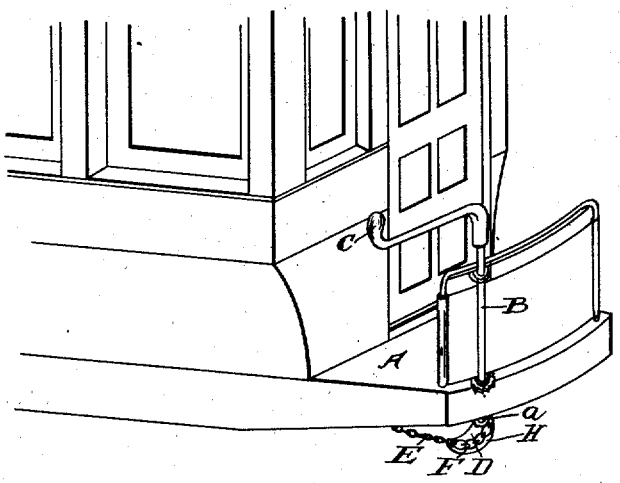
Figure 3:
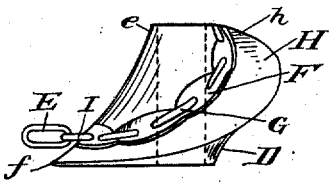
Figure 4:
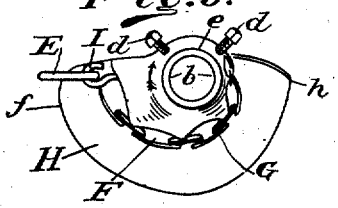
Figure 2:
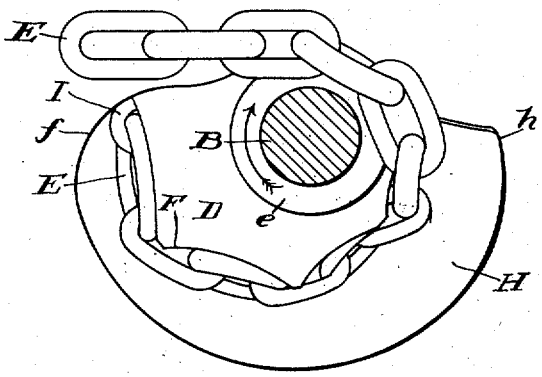
Figure 5:
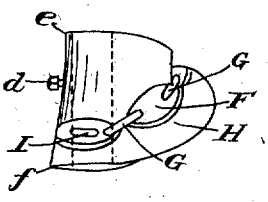
Figure 6:
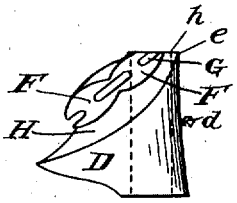

Referring to the drawings, Figure 1 represents a fragmentary perspective view of a street-car, illustrating the application and operative position of my appliance; Fig. 2, a top plan of my device, showing the brake-chain thereon in the position in which brakes are being applied; Fig. 3, an elevation; Fig. 4, a top plan; Fig. 5, an elevation, and Fig. 6 an elevation of the reverse side from that shown in Fig. 5.

Similar letters of reference in the several figures designate similar parts.

My device may be termed a "drum," since it performs the functions of such; but by reason of its peculiar irregular form and manifold functions it may be properly termed in the interest of brevity in description a "conico-eccentrical drum," since it resembles both of such forms in parts of its contour.

In Figs. 1, 3, and 4 the positions of the drum are such as is usual when the brakes are off or in running position and all the slack paid out. In Fig. 2 the drum is in the same relative position; but it is assumed that it has been rotated one complete revolution about its axis, so that the slack of the chain is wound about it. The chain may lead to any suitable lever or other brake connection whereby the brakes may be operated, as is usual, by rotation of the brake-staff B, suitably mounted on the platform A.

The drum D is suitably composed of cast-iron formed in one piece and has a body portion forming a somewhat long hub *e*, having a bore *b* adapted to fit closely on the lower end *a* of the brake-staff B or other suitable rotating shaft, to which it is secured by set-screws *d* or by a key. About the hub the body portion extends conico-eccentrically through about two-thirds of its circumference—that is to say, it has a long projection at the bottom of the hub at one side, receding thence gracefully to the top of the hub, thus forming a top face that is concavo-conical in its vertical aspect, extending partially about the hub, as shown, and from the point of extreme projection at the bottom the body recedes from left to right eccentrically until its periphery joins the hub at the side about opposite the point of greatest projection. At the point of greatest projection the body portion extends outwardly in the form of a blade, which, continuing about the body, forms a broad flaring inclined guide-flange H from the point *f* at the bottom of the body to the point *h* at the top and opposite side thereof, the peripheral line of the flange following a conico-eccentrical course corresponding somewhat to the periphery of the body portion, but preferably projecting farther from the body as it nears the top thereof in order to more easily raise the chain E when it becomes more taut in applying the brake. The top surface of the flange is smooth and transversely is of concave form at the bottom and convex, particularly at the outer edge, thence to the top, so that the chain may mount the flange with certainty and smoothly. Above the inclined flange and conforming to the inclination thereof and to the eccentricity of the body portion is a chain-channel extending from above the point *f*, where an eyebolt I is set in the channel, to the top of the hub near the point *h*, where the channel ends close to the staff B, so that the chain E may wind from the channel onto the staff when the maximum force is required. The attached end of a brake-chain E is connected to the eyebolt I, so that when the staff B is rotated to the right the chain is drawn into the channel by the flange and the slack thereof taken up partly by the eccentricity of the drum and further by the vertical lap or rise of the chain. Preferably I form chain-recesses F and G in the chain-channel, the advantage of which is obvious and well known.

In practical use the full portion of the drum provides for an amount of slack to prevent undue friction of the brake-shoes against the wheels instead of having a sagging chain, as is usual. In applying the brakes the lever C is moved about in the usual manner to the right, rotating the drum in the direction indicated by the arrows, and as the chain is connected thereto somewhat removed from the axis thereof there is a great degree of "throw" at first, decreasing as the slack is taken up, and as the chain winds about and upward conico-eccentrically in the channel or series of recesses to the top of the drum, at which point in the operation it is designed that the strain shall take place, providing the greatest amount of leverage as the brakes are thus set, with the pull delivered from a point closest to the axis of the drum. It will be observed that the slack is taken up quickly, not only through the eccentricity of the drum, but by reason also of its having to lap vertically as it is wound about the drum.

It will be obvious that in lieu of the chain-recesses F and G, I may employ a smooth groove; but I do not deem the latter arrangement as advantageous in case the eyebolt I should become weakened through wear.

Having thus described my invention, what I desire to claim as new and to cover by Letters Patent is—

An improved drum for brake-staffs, consisting of a hub, having a thickened portion projecting laterally at one end thereof and terminating in a broad blade, the upper face of which recedes conically to the opposite or upper end of the hub, said thickened portion also extending eccentrically about the hub, a channel in said thickened portion, and the flange extending outwardly so as to gradually guide chain-links smoothly into the channel, substantially as shown for the purpose set forth.

DANIEL TAGGART.

Witnesses:
MARY L. EGAN,
NATHAN H. BENSON.